United States Patent Office 3,082,109
Patented Mar. 19, 1963

3,082,109
COLLODIAL DISPERSION OF METALS IN PLASTICS
Richard G. Devaney and John W. Tamblyn, Kingsport, Tenn., assignors to Eastman Kodak Company, Rochester, N.Y., a corporation of New Jersey
No Drawing. Filed Sept. 30, 1958, Ser. No. 764,274
11 Claims. (Cl. 106—193)

This invention concerns the incorporation of metals in plastics to produce special effects. More particularly, this invention concerns the production of very fine particle size metal particles in plastics.

The incorporation of metallic pigments in paints and plastic compositions has long been practiced for both decorative and protective purposes. In addition metal powders, pulverized filling materials, mineral powders, soluble dyes, insoluble dyes, dye stuffs, mica, asbestos, and the like have been used. Special effects have been obtained by using metal flakes. Metal may be floured and the metal flour bound together with a grease such as lard and the flour mixed together with cellulose acetate in order to produce a molded article which gives a metallic appearance.

However, the pigments used in the prior art have usually had a particle size range of 0.1 to 100 microns in diameter. We have found that much finer dispersions of metals in plastics may be obtained by special techniques which give particle sizes below 0.01 micron in diameter.

These dispersions vary in appearance from pale transparent colors to opaque, the color and intensity depending upon the nature of the metal, on its degree of dispersion, on its concentration, and on the thickness of the plastic sample containing the dispersion.

One object of this invention is to produce a plastic material having a very finely dispersed metal therein. Another object of this invention is to provide a process for dispersing metal in plastics whereby a very small amount of metal is required. An additional object is to provide a method for dispersing metal in plastics for coloring purposes so that the metal particle sizes are below about 0.01 micron in diameter. A further object is to prepare colloidal dispersions of metals in plastic media such as fibers, films, sheets and molded shapes. An additional object is to obtain decorative effects such as pale, transparent colors or grays and blacks of varying intensities, irridescence, pearlescence, and semi-transparency. Another object is to obtain heat and light stable colors. A further object is to obtain protective effects such as stabilization of the plastic material against the damaging action of sunlight.

The above objects are obtained by incorporating metals which melt at or below the temperature of the metal rolls used for compounding the plastic material. A plastic material which is compounded on hot rolls is mixed with a suitable metal which is either a liquid or which becomes a liquid below the temperature of the hot rolls. When a plastic has been compounded sufficiently to disperse the melted metals throughout, it is fabricated into final shape by the customary plastic processing methods. The following examples are intended to illustrate but not to limit our invention.

Example 1

One tenth percent of gallium (melting point, 86° F.) was rolled directly into powdered cellulose acetate butyrate and rolled at 290° F. for 4 minutes. The molten metal readily dispersed in the plastic which gave a barely transparent gray black color to a compression molded 50 mil sheet. No particles of microscopic size were visible.

Example 2

One percent Wood's metal (50% bismuth, 25% lead, 12.5% tin, and 12.5% cadmium) was incorporated as in Example 1. This low melting alloy (melting point, 158° F.) also dispersed very easily to give a 50 mil sheet so intensely colored (gray black with a slight brownish cast) that the sun's disk was barely visible when viewed through it.

Example 3

One percent ordinary 2:1 (by weight) tin:lead solder (melting point, 356° F.) was premelted and added on the hot compounding rolls to cellulose acetate butyrate. The roll temperature was increased to 320° F. in order to keep the solder melted long enough for a good dispersion. A dark gray opaque sheet was obtained.

Example 4

Twenty parts of the eutectic fusible alloy having the composition 51.2% tin, 30.6% lead and 18.2% cadmium with melting point at 287° F. was roll-compounded with 100 parts of yarn-type cellulose acetate and tripropionin at 320° F. This concentrate was dissolved in an acetone yarn-dope and dry-spun to give cellulose acetate yarn with a metal content of 0.2%. The yarn had a pale gray tint.

Example 5

One percent o fthe ordinary solder of Example 3 was incorporated by roll-compounding in a polyester made from 6.5 moles of sebacic acid, 3.5 moles of p,p'-dicarboxy diphenyl sulfone and 10 moles of 1,5-pentanediol. The resulting composition had a dark gray color. Microscopic examination showed most of the particles to be very fine, but some with diameters greater than 1 micron were visible.

Example 6

Ten parts of the solder used in Examples 3 and 5 were converted to fine filings and mixed with 100 parts of a finely powdered polyester composed of p,p'-dicarboxy diphenyl sulfone and 1,5-pentanediol. This mixture was extruded at 500° F. to give a gray sheet. The resulting dispersion was not as fine as the ones obtained by roll compounding.

Example 7

One tenth of one percent Wood's metal was roll compounded with medium density (0.933) polyethylene (melt index 1.7) at 260° F. A bluish gray translucent composition of very pleasing appearance resulted.

Example 8

One tenth of one percent Wood's metal was roll compounded with dioctyl phthalate-plasticized polyvinyl chloride at 290° F. An attractive translucent gray composition resulted.

Example 9

One percent ordinary 2:1 (by weight) tin:lead solder (melting point, 356° F.) was premelted and added on the hot compounding rolls to 100 parts of yarn-type cellulose acetate and tripropionin at 320° F. This concentrate was dissolved in an acetate yarn dope and dry spun to give cellulose acetate yarn with a metal content of 0.2%. The yarn had a pale gray tint.

Example 10

One hundred parts of cellulose acetate propionate (3% acetyl; 45% propionyl) was roll-compounded at 320° F. for 4 minutes with 15 parts of triethylene glycol di-2-ethylhexoate and 200 parts of a low melting lead solder containing 2:1 (by weight) tin:lead and having a melting point of 356° F. This composition is a heavy moldable plastic; useful for shielding against X-rays and other damaging radiations. It leaves a permanent mark when rubbed on paper, and could thus be used in the form of extruded rod for lead pencils. Even at such high concentrations of metal these plastic compositions are electrically nonconducting indicating that the degree of dispersion is excellent, the metal particles being well insulated from each other by intervening plastic media.

*Example 11*

One tenth of one percent Wood's metal was roll compounded with low density (0.918) polyethylene (melt index 2.0) at 260° F. A bluish gray translucent composition of very pleasing appearance resulted.

*Example 12*

One hundred parts of high density (0.955) polyethylene (melt index 0.7) was roll compounded at 300° F. with 100 parts of Wood's metal to give a plastic composition useful for absorbing X-rays and other high energy radiations.

*Example 13*

One hundred parts of polypropylene (density 0.920, melt index 0.08) was extrusion-compounded at 550° F. with 10 parts of 2:1 tin:lead solder and re-extruded as yarn of three denier per filament. Such yarn can be used to make protective clothing for X-ray and atomic energy workers.

*Example 14*

One hundred parts of a polyester made from five moles of terephthalic acid, one mole of isophthalic acid and six moles of 1,4-cyclohexane dimethanol was extrusion-compounded at 550° F. with 0.1 part gallium. The granulated composition was re-extruded at 550° F. in the form of a 10-mil thick film having a pleasing neutral gray color.

*Example 15*

One hundred parts of a polyester made from three moles of terephthalic acid, two moles of succinic acid, and five moles of 1,4-cyclohexane dimethanol was extrusion-compounded at 550° F. with 100 parts of 2:1 tin:lead solder. This composition was granulated and injunction molded in the form of boxes which could be used to protect the contents from harmful radiation.

*Example 16*

One hundred parts of an equimolar mixture of dimethyl terephthalate and 1,4-cyclohexane dimethanol were polyesterified in the presence of 0.5 part of 2:1 tin:lead solder. After suitable granulation, this composition was extruded as yarn having a stable gray color.

*Example 17*

One hundred parts of polyvinyl chloride was roll compounded at 290° F. with 50 parts of dioctyl phthalate and 200 parts of a low melting 2:1 (by weight) tin-lead solder (melting point, 356° F.). This was calendered into a 20-mil. thick sheets useful for shielding X-ray and other radiation equipment.

Percentages of dispersed metal in the above examples are intended to be by weight percents of the thermoplastic material. Other metals may be colloidally dispersed in any one of the great variety of thermoplastic media by the direct rolling method described in the examples, provided that the metals used melt at temperatures below those of the compounding rolls or are liquid at those temperatures. Since many rolls have a maximum operating temperature of about 300° F., the use of an eutectic fusible alloy (50% tin, 32% lead, 18% cadmium; melting point, 293° F.) provides a convenient, economical source of metal for colloidal dispersion in plastics, and thermoplastics. Higher concentration of metals than those illustrated in the examples may be used; for instance, up to 75 or 80% of metal may be incorporated without destroying the plastic nature of the composition.

In the manufacture of dope-spun or melt-spun fibers, it is often difficult to obtain good direct dispersions of certain colors. However, well dispersed gray tints can be incorporated in such fibers by the addition of small amounts of a 2:1 tin-lead solder. Various other effects may be produced using our process depending on the nature of the metal, its degree of dispersion, its concentration, and the thickness of the thermoplastic. For instance, low concentrations of colloidally dispersed metal may be used to give heat-and-light-stable pastel shades of color to plastic articles made into films, fibers or molded articles. Higher concentrations of the dispersed metal may be used to obtain various decorative stable color effects. As is typical of colloidal dispersions, the appearance and the color depend on the angle from which the dispersion is viewed.

Pearlescent and other decorative effects may be obtained in thermoplastic compositions by compounding together, as a biphase mixture, two mutually incompatible thermo plastics one of which contains a relatively high concentration of the colloidally dispersed metal. Various other metals such as indium and mercury may be used in our invention in addition to our preferred embodiments of gallium, Wood's metal, 2:1 tin:lead solder and the above mentioned alloy of tin, lead and cadmium. Numerous other low melting alloys such as Lipowitz alloy, bismuth solder, Rose metal, and various eutectic fusible alloys and amalgams may also be used.

Protective effects may also be obtained by incorporating as much as one percent 2:1 tin:lead solder dispersed in a 50-mil thick plastic sheet which effectively excludes ultraviolet radiation. A similar sheet containing 70% of the same solder was as opaque to X-ray radiation as a 5-mil thick sheet of pure lead. Accordingly, articles such as a radiation dosimeter can easily be fabricated from these thermoplastic compositions containing heavy metals such as lead or bismuth.

This application is a continuation-in-part of application Serial No. 542,080, filed August 21, 1955, now abandoned.

The terms, plastic materials and thermoplastic materials, as used herein are intended to mean organic thermoplastic synthetic materials.

We claim:

1. A composition of matter consisting essentially of cellulose acetate having a metal which melts at a temperature of less than 350° F. colloidally dispersed therein, said dispersion having occurred while both the metal and cellulose acetate were in a molten condition, at which time the molten metal was colloidally dispersed in the molten cellulose acetate.

2. A composition of matter consisting essentially of cellulose acetate butyrate having a metal which melts at a temperature of less than 350° F. colloidally dispersed therein, said dispersion having occurred while both the metal and the cellulose acetate butyrate were in a molten condition, at which time the molten metal was colloidally dispersed in the cellulose acetate butyrate.

3. A composition of matter consisting essentially of a thermoplastic cellulose organic acid derivative having a metal which melts at a temperature of less than 350° F. colloidally dispersed therein, said dispersion having occurred while both the metal and the cellulose organic acid derivative were in a molten condition, at which time the molten metal was colloidally dispersed in the molten cellulose organic acid derivative.

4. A composition of matter consisting essentially of cellulose acetate butyrate having a metal selected from the class consisting of gallium, Wood's metal, mercury, indium, 2:1 tin:lead solder and an eutectic alloy of 50% tin, 32% lead, and 18% cadmium colloidally dispersed in the cellulose acetate butyrate, said dispersion having occurred at a temperature when both the metal and the cellulose acetate butyrate were in a molten condition, at which time the 5. A composition of matter consisting essentially of cellulose acetate having a metal selected from the class consisting of gallium, Wood's metal, mercury, indium, 2:1 tin:lead solder and an eutectic alloy of 50% tin, 32% lead, and 18% cadmium colloidally dispersed in the cellulose acetate, said dispersion having occurred at a temperature when both the metal and the cellulose acetate were in a molten condition, at which time the molten metal was colloidally dispersed in the molten cellulose acetate.

6. A composition of matter consisting essentially of a cellulose organic acid derivative having a metal selected from the class consisting of gallium, Wood's metal, mercury, indium, 2:1 tin:lead solder and an eutectic alloy of 50% tin, 32% lead, and 18% cadmium colloidally dispersed in the cellulose organic acid derivative, said dispersion having occurred at a temperature when both the metal and the cellulose organic acid derivative were in a molten condition, at which time the molten metal was colloidally dispersed in the cellulose organic acid derivative.

7. A process for preparing colloidal dispersions of metals in cellulose acetate butyrate consisting essentially of adding a metal which has a melting point of less than 300° F. to the cellulose acetate butyrate, heating the cellulose acetate butyrate and the metal to a temperature such that the metal and cellulose acetate butyrate are both in a molten condition and then colloidally dispersing the molten metal in the molten cellulose acetate butyrate.

8. A process for preparing colloidal dispersions of metals in a cellulose organic acid derivative consisting essentially of adding a metal which has a melting point of less than 300° F. to the cellulose organic acid derivative, heating the cellulose organic acid derivative and the metal to a temperature such that the metal and the cellulose organic acid derivative are both in a molten condition and then colloidally dispersing the molten metal in the molten cellulose organic acid derivative.

9. A process for obtaining good heat- and light-stable cellulose acetate butyrate consisting essentially of incorporating a molten metal selected from the class consisting of gallium, Wood's metal, mercury, indium, 2:1 tin:lead solder and an eutectic alloy of 50% tin, 32% lead, and 18% cadmium in the cellulose acetate butyrate, heating the cellulose acetate butyrate and metal to a temperature sufficiently high to maintain the metal in a molten condition, and then colloidally dispersing the molten metal in the molten cellulose acetate butyrate.

10. A process for obtaining a good heat- and light-stable cellulose organic acid derivative consisting essentially of incorporating a molten metal selected from the class consisting of gallium, Wood's metal, mercury, indium, 2:1 tin:lead solder and an eutectic alloy of 50% tin, 32% lead, and 18% cadmium in the cellulose organic acid derivative, heating the cellulose organic acid derivative and metal to a temperature sufficiently high to maintain the metal in a molten condition, and then colloidally dispersing the molten metal in the molten cellulose organic acid derivative.

11. A process for obtaining good heat- and light-stable cellulose acetate consisting essentially of incorporating a molten metal selected from the class consisting of gallium, Wood's metal, mercury, indium, 2:1 tin:lead solder and an eutectic alloy of 50% tin, 32% lead, and 18% cadmium in the cellulose acetate, heating the cellulose acetate and metal to a temperature sufficiently high to maintain the metal in a molten condition, and then colloidally dispersing the molten metal in the molten cellulose acetate.

References Cited in the file of this patent

UNITED STATES PATENTS

| | | |
|---|---|---|
| 1,792,262 | Wilson | Feb. 10, 1931 |
| 2,502,949 | Howlett et al. | Apr. 4, 1950 |
| 2,543,536 | Sherman | Feb. 27, 1951 |
| 2,833,030 | Peaslee | May 6, 1958 |